Figure 1:
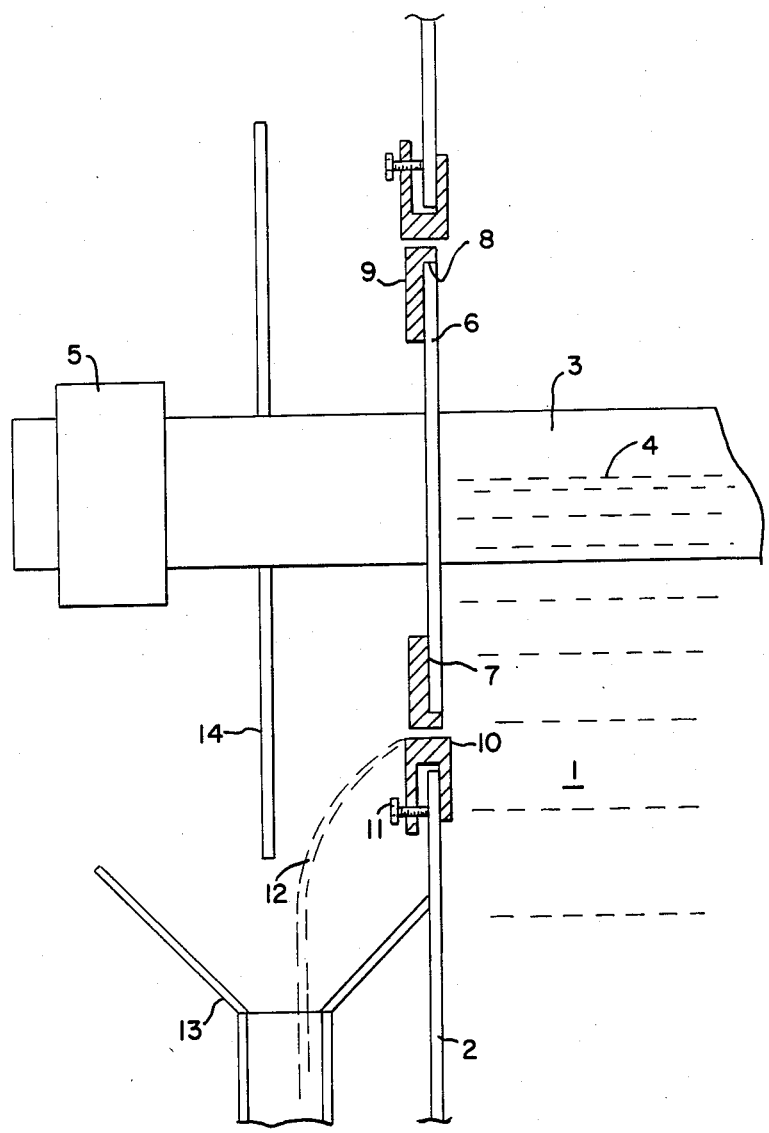

United States Patent [19]
Barra

[11] Patent Number: 4,664,391
[45] Date of Patent: May 12, 1987

[54] APPARATUS FOR RETAINING A LIQUID PHASE, BETWEEN A WALL AND A ROTARY MEMBER PASSING THERETHROUGH

[75] Inventor: Jean Barra, Gardanne, France
[73] Assignee: Aluminum Pechiney, France
[21] Appl. No.: 571,366
[22] Filed: Jan. 16, 1984
[30] Foreign Application Priority Data Feb. 28, 1983 [FR] France ................. 83 03633

[51] Int. Cl.⁴ ............................................. F16J 15/40
[52] U.S. Cl. ................................... 277/13; 277/15; 277/17; 277/67; 277/68; 277/135; 277/184; 277/189
[58] Field of Search ................. 277/54, 81 R, 24, 15, 277/17, 189, 95, 181, 13, 14 R, 14 U, 135, 67, 68, 69, 184

[56] References Cited

U.S. PATENT DOCUMENTS

| | | | |
|---|---|---|---|
| 1,626,237 | 4/1927 | Hodgkinson | 277/81 R X |
| 1,732,761 | 10/1929 | Marsland | 277/13 |
| 2,011,206 | 8/1935 | Vandermeer | 277/67 |
| 2,428,041 | 9/1947 | Saywell | 277/95 |
| 2,678,835 | 5/1954 | Clark, Jr. | 277/135 |
| 2,838,451 | 6/1958 | Long et al. | 277/95 X |
| 2,851,290 | 9/1958 | Hanson | 277/15 |
| 2,966,375 | 12/1960 | Vegezzi | 277/15 |
| 2,994,571 | 8/1961 | Peras | 277/54 |
| 3,019,035 | 1/1962 | Klompas | 277/54 |
| 3,020,185 | 2/1962 | Moffitt, Jr. et al. | 277/181 X |
| 3,070,378 | 12/1962 | Bojako et al. | 277/95 X |
| 3,306,223 | 2/1967 | Liebis | 277/82 X |
| 3,455,561 | 7/1969 | Rinker et al. | 277/67 X |
| 3,705,728 | 12/1972 | Millar | 277/81 R |
| 3,765,688 | 10/1973 | Junker | 277/67 X |
| 3,870,384 | 3/1975 | Ladin | 277/95 X |
| 4,330,133 | 5/1982 | Palpreyman | 277/54 |

FOREIGN PATENT DOCUMENTS

| | | | |
|---|---|---|---|
| 481788 | 1/1927 | Fed. Rep. of Germany | 277/81 R |
| 2223222 | 5/1972 | Fed. Rep. of Germany | 277/54 |
| 258898 | 6/1928 | Italy | 277/54 |

Primary Examiner—Allan N. Shoap
Attorney, Agent, or Firm—McDougall, Hersh & Scott

[57] ABSTRACT

An apparatus for retaining a liquid phase which may include solid materials between a fixed wall and a rotary member passing therethrough. A seal is thereby provided which eliminates friction while accepting limited leakage of the liquid phase. The apparatus includes:

(a) a partition member which is fixed with respect to the rotary member and the periphery of which has at least one planar surface which is perpendicular to the axis of rotation of the rotary member. This forms a bearing surface, and a surface which is concentric to the axis and which is joined to the bearing surface;

(b) a retaining ring which is positioned on the planar surface and the concentric surface of the partition member, and which is fixed with respect to the rotary member; and, (c) a collar joined to the wall and having an inside diameter that is at least equal to the outside diameter of the ring. The collar is longitudinally positioned on the wall through which the rotary member passes, and has an adjusting and locking device for preventing rotation thereof.

6 Claims, 6 Drawing Figures

APPARATUS FOR RETAINING A LIQUID PHASE, BETWEEN A WALL AND A ROTARY MEMBER PASSING THERETHROUGH

The invention concerns a retaining apparatus, between a fixed wall and a rotary member passing therethrough, for retaining a liquid phase which is possibly charged with solid materials forming a suspension, in order to provide a sealing arrangement for eliminating friction, while however accepting limited leakage of the liquid phase.

It has long been well known that any rotary machine provided with a drive shaft which is in partial or total contact with a liquid phase must be provided with a sealing arrangement disposed between the rotary member and a fixed part of the machine.

When the rotary machine has a drive shaft of small diameter, as is the case for example with the shafts of pumps, especially adapted sealing arrangements were designed and developed many years ago. Thus, old arrangements of stuffing box type have been used and are still in use nowadays. However, more recent and much more elaborate apparatuses which are also used comprise for example rings or concertina-like members of special materials or encased with special materials such as elastomers, such as some of which are described in U.S. Pat. Nos. 3,269,738 and 3,480,285, or rotary contact sealing assemblies, such as one of which is described in British Pat. No. 1 051 021.

Such arrangements meet the requirements of the man skilled in the art when, in regard to rotary machines having a small-diameter drive shaft, a flexible sealing arrangement is to be positioned in such a way as to provide for an axial movement of limited amplitude, while retaining an efficient sealing action.

As soon as a rotary machine has a drive shaft which is of large diameter, being for example at least 500 mm, the drive shaft being partially or totally immersed in a liquid phase, as is the case in particular with filtration equipment, for example of the rotary disc filter type, a sealing arrangement between the rotary and the fixed parts of such a machine is required and may draw inspiration from the sealing arrangements which are intended for small-diameter drive shafts. Rotary filters of that kind, which are highly appreciated in the field of separating liquid and solid phases from suspensions resulting from ore attach operations, in accordance with hydrometallurgical processes, are described for example in 'Chemical Engineers Handbook' pages 978 to 981, by John H Perry, edition McGraw Hill Book Company 1950, or in U.S. Pat. No. 3,948,779.

As described, rotary disc-type filters comprise an array of disc which are fixed in a parallel arrangement on a hollow horizontal shaft in which a suction force is produced. Each disc is formed by a plurality of independent section members lined with metal gauze and/or filtering textile bags, which are connected to the above-mentioned hollow horizontal shaft.

In a filtering operation, the disc provided with their sector members are immersed in a feed trough for feeding the suspension to be filtered, the solid phase being caused to cling to the filtering gauzes by the suction effect while the liquid phase which is separated off flows away in the horizontal collector shaft by means of connections which are provided between each section member and the shaft itself. The solid phase which is disposed on the filter gauze is then dried when it passes through the free air, and then removed by scraping the filtering surfaces by means of a scraper.

However, the large-diameter design of such sealing arrangements which are intended for the above-mentioned rotary machines is highly expensive, as moreover is the subsequent maintenance thereof.

More than that, the increased-size sealing arrangements are of lower efficiency as they require much lower speeds of rotation, while consuming, in proportion, a much larger amount of energy.

All the above-mentioned disadvantages accordingly led the applicants to design and create an apparatus for retaining a liquid phase, forming a leakage-type seal for limiting the flow of the liquid phase therethrough, being an industrial arrangement which is better adapted to the problem raised by a fixed wall being traversed by a rotary member or a drive shaft which is partially or totally immersed in the liquid phase which may comprise solid materials in suspension.

According to the invention, the apparatus for retaining a liquid phase which is possibly charged with solid materials forming a suspension, between a fixed wall and a rotary member passing therethrough, is characterised in that said apparatus comprises:

(a) a partition member which is fixed with respect to the rotary member and the periphery of which has at least one planar surface which is perpendicular to the axis of rotation of said member and which forms a bearing surface and a surface which is concentric to said axis and which is joined to the bearing surface, (b) a retaining ring which is positioned on the planar surface (bearing surface) and the concentric surface of the partition member which is fixed with respect to the rotary member, and (c) a collar member which is joined to the wall, being of inside diameter which is at least equal to the outside diameter of the ring, being provided with a means for longitudinal positioning thereof on said wall through which the rotary member passes, and a transverse adjusting and locking means for preventing rotary movement thereof.

The rotary member to which the apparatus according to the invention is applied may be of any transverse dimension, that is to say, it may be of a diameter which may be from the diameter of a conventional pump shaft up to the diameter of rotary filters, for example. However, this apparatus is more particularly an attractive proposition in regard to rotary members which are of a diameter that is at least equal to 500 mm. In addition, the rotary member which is a drive shaft is generally of circular section tub it may be of polygonal or elliptical section.

The partition member which is of circular shape and which is fixed with respect to the rotary member is preferably a planar surface which is disposed in a plane perpendicular to the rotary member. However, the partition member may also be a more elaborate surface such as frustoconical, cylindro-conical, hemispherical, convex or concave . . . The above-mentioned partition member is also provided on its periphery with at least one planar surface serving as a bearing surface which is disposed in a plane perpendicular to the axis of rotation of said member. Rigidly joined to the above-mentioned bearing surface is a concentric surface, that is to say, a surface which is coaxial with the rotary member.

Disposed in the space defined by the bearing surface or surfaces and the concentric surface is a retaining ring which bears on the bearing surface or surfaces. The ring may be made for example of a machined or cast metallic material, for example made for cast iron, ordinary or special steels, light aluminium-base alloys or powder metallurgy. However, the ring may also be made by moulding natural or synthetic polymer materials such as rubbers, polyamides, polyimides, polyesters and halogenated polymers.

The retaining ring may be of a section of type as varied as a square section, a rectangular section, a circular section or a section in the form of the letters H, L, T and U.

The collar or shroud member which is a cylindrical surface has an inside diameter that is at least equal to or slightly greater than the outside diameter of the ring. The difference in diameter essentially depends on the size of the solid matter contained in the liquid phase and is zero when there is no solid material in the liquid phase. In consequence, leakage which is limited or zero occurs between those two components. The extent of the covering effect afforded by the collar may be partial or total, depending on the level of the liquid phase. The position of the collar with respect to the retaining ring may be determined by longitudinal and transverse adjusting means of known types. As soon as the appropriate adjustment has been set, the collor is held in position by locking means which are also well known. The collar may be of a section of type as varied as I, L, T or inverted U section.

In accordance with an alternative form of the invention, which may be found to be an attractive proposition in some particular cases for further reducing leakkage at the seal, while tolerating a slight amount of friction, the collar or the partition member may be made of a flexible material such as for example rubber.

The invention will be better appreciated by reference to the following specific description of FIGS. 1 to 6 illustrating the invention.

Figure 2:
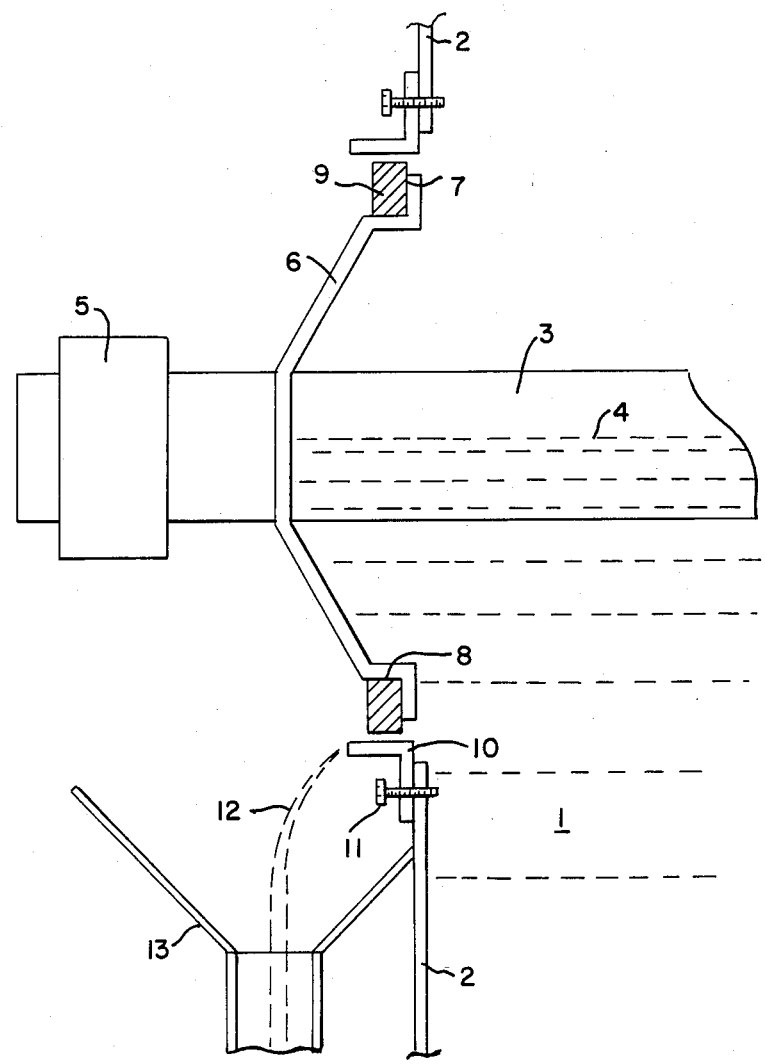

FIG. 1 shows a view in vertical section of the apparatus according to the invention for retaining a liquid phase, between a fixed wall and a rotary member passing therethrough, FIG. 2 shows a view in vertical section of another apparatus according to the invention for retaining a liquid phase, between a fixed wall and a rotary member passing therethrough, and FIGS. 3 to 6 show a simplified view in vertical section of the alternative forms of the apparatus according to the invention.

Referring to FIG. 1, the apparatus according to the invention is intended to retain a suspension 1, the liquid and solid phases of which are to be separated, as between a fixed wall 2 which is a component of a vessel or tank of a disc-type filter, and a rotary member 3 which passes through the wall 2, being a drive shaft of the filter, which is held by place by a bearing 5 and which is partially immersed in the suspension 1, at the level 4.

The apparatus comprises a planar partition member 6 which is fixed with respect to the rotary drive shaft member 3 and which is perpendicular to the axis thereof, the periphery thereof having a planar surface 7 which is perpendicular to its axis, forming a bearing surface, and a concentric surface 8 which is joined or fixed with respect to the bearing surface. A retaining ring 9 which is of L-shaped cross-section is positioned on the bearing surface 7 and the concentric surface 8 of the partition member 6. A collar or shroud 10 of U-shaped cross-section, the inside diameter of which is slightly larger than the outside diameter of the ring 9, is provided with a known means 11 for longitudinally and transversely positioning same on the fixed wall 2. Consequently, the small fraction of the liquid phase flows away as indicated at 12 into a recovery means 13, providing for recycling of that fraction to the interior of the tank of the rotary disc-type filter. The bearing 5 may optionally be protected from spraying or splashing, which is a rare occurrence, by means of a barrier shown schematically at 14 which is fixed with respect to the drive shaft 3.

Referring to FIG. 2, the apparatus according to the invention is intended to retain a suspension 1, the liquid and solid phases of which are to be separated. The retaining action is to occur between the fixed wall 2 of the tank of a rotary disc-type filter and the drive shaft 3 (rotary member) passing therethrough, which is held in place by the bearing 5 and which is partially immersed in the suspension 1, as indicated by the level 4.

The apparatus comprises the partition member 6 which is in the form of a frustoconical surface which is fixed with respect to the drive shaft 3 and which is coaxial therewith. The periphery of the partition member 6 has a planar surface 7 which acts as a bearing surface, and a concentric surface 8 which is joined to or fixed with respect to the bearing surface. The retaining ring 9, which is of square section, is positioned on the bearing surface 7 and the concentric surface 8 of the partition member 6. The collar or shroud 10 which is of L-shaped cross-section is provided with a known means 11 for transverse and longitudinal positioning thereof on the fixed wall 2. The fraction of liquid 12 which escapes through the gap between the retaining ring 9 and the collar 10 is collected by a recovery means 13 providing for recycling of that fraction to the inside of the tank of the rotary disc-type filter.

Figure 3:
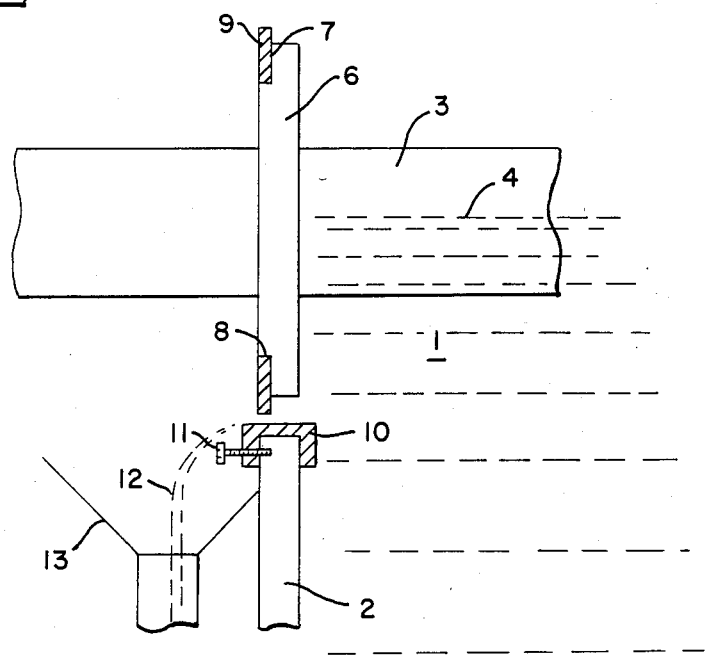

Referring to FIG. 3, the apparatus is intended to provide for retaining the liquid phase between the fixed wall 2 and the rotary member 3 which passes therethrough and which is partially immersed in the liquid phase 1, as indicated by the level 4.

The apparatus comprises the partition member 6 which is in the form of a planar surface fixed with respect to the rotary member 3 and perpendicular to the axis thereof. The periphery of the partition member 6 has a planar surface 7 which acts as a bearing surface, and a concentric surface 8 which is joined to or fixed with respect to the surface 7. The retaining ring 9 which is of rectangular or I-shaped cross-section is positioned on the surface 7 and the concentric surface 8 of the partition member 6. The collar or shroud 10 of U-shaped cross-section is provided with a known means 11 for transverse and longitudinal positioning thereof. The liquid fraction 12 which escapes through the gap between the retaining ring 9 and the collar 10 is collected by a recovery means 13.

Figure 4:
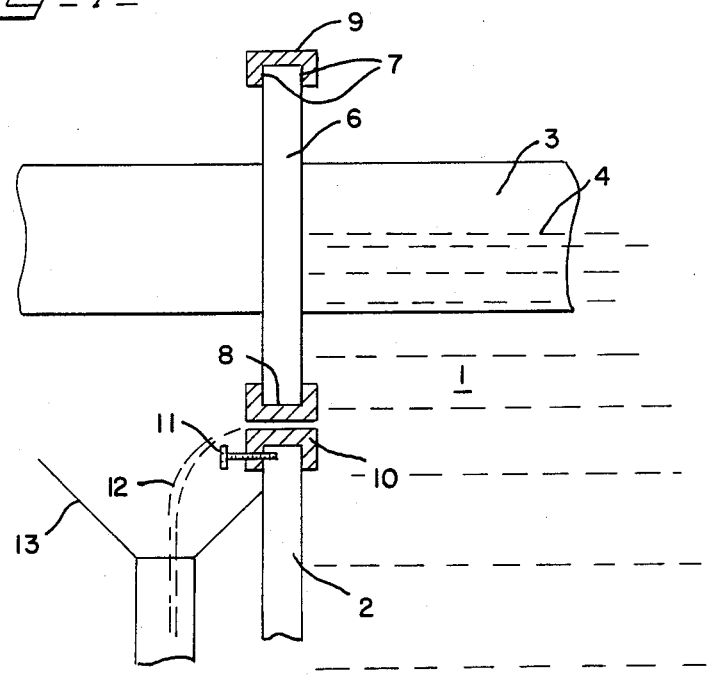

In FIG. 4, the apparatus is intended to provide for retaining the liquid phase between the fixed wall 2 and the rotary member 3 which passes therethrough, being partially immersed in the liquid phase 1, as indicated by the level 4.

The apparatus comprises the partition member 6 which is in the form of a planar surface fixed with respect to the rotary member 3 and perpendicular to the axis thereof. The periphery of the partition member 6 has two planar surfaces 7 acting as bearing surfaces, and a concentric surface 8 which is joined to the surface 7. The retaining ring 9 which is of U-shaped cross-section is positioned on the surfaces 7 and the concentric surface 8 of the partition member 6. The collar 10 which is of U-shaped cross-section is provided with a known means 11 for transverse and longitudinal positioning thereof. The liquid fraction 12 which escapes through the clearance between the retaining ring 9 and the collar 10 is collected by a recovery means 13.

Figure 5:
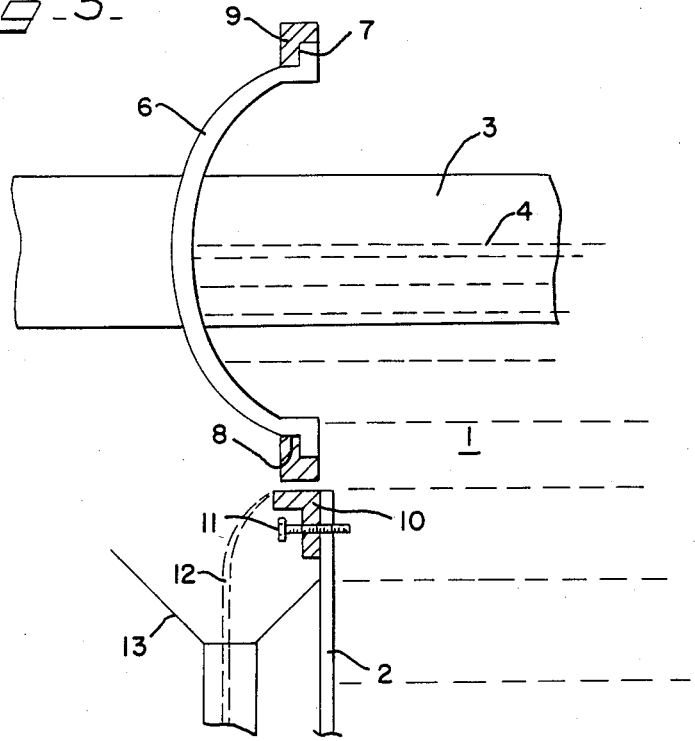

In FIG. 5, the apparatus is intended to retain the liquid phase between the fixed wall 2 and the rotary member 3 which passes therethrough and which is partially immersed in the liquid phase 1, at the level 4.

The apparatus comprises the partition member 6 which is in the form of a hemispherical surface fixed with respect to the rotary member 3 perpendicularly to the axis thereof. The periphery of the partition member 6 has a planar surface 7 acting as a bearing surface, and a concentric surface 8 which is joined to the bearing surface 7. The retaining ring 9 which is of L-shaped cross-section is positioned on the surface 7 and the concentric surface 8 of the partition member 6. The collar 10 which is of L-shaped cross-section is provided with a known means 11 for transverse and longitudinal positioning thereof. The fraction of liquid 12 which escapes through the clearance between the retaining ring 9 and the collar 10 is collected by a recovery means 13.

Figure 6:
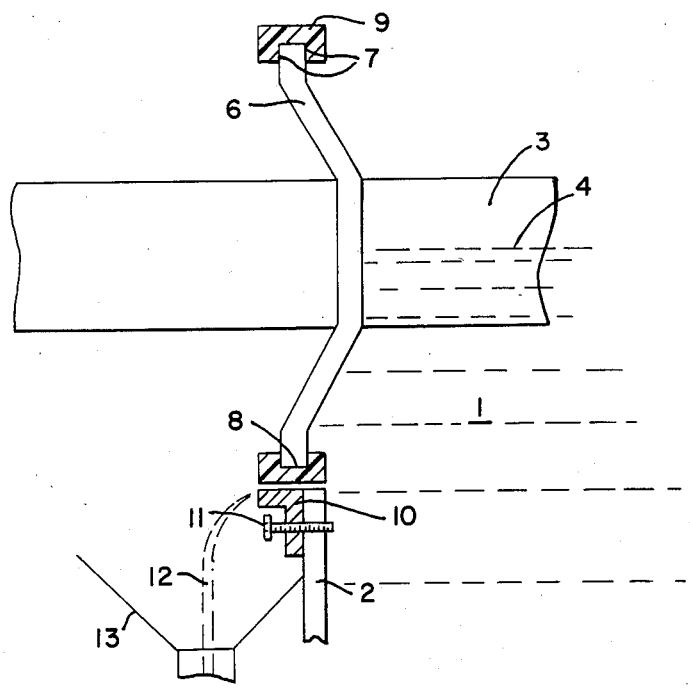

Referring to FIG. 6, the apparatus is intended to retain the liquid phase between the fixed wall 2 and the rotary member 3 which passes therethrough, being partially immersed in the liquid phase 1 as indicated by the level 4.

The apparatus comprises the partition member 6 which is in the form of a frustoconical surface that is fixed with respect to the rotary member 3 and perpendicular to the axis thereof. The periphery of the partition member 6 has two planar surfaces 7 acting as bearing surfaces, and a concentric surface 8 which is joined to the surfaces 7. The retaining ring 9 which is of U-shaped cross-section is positioned on the surfaces 7 and the concentric surface 8 of the partition member 6. The collar 10 which is of L-shaped cross-section is provided with a known means 11 for transverse and longitudinal positioning thereof. The liquid fraction 12 which escapes through the gap between the retaining ring 9 and the collar 10 is collected by a recovery means 13.

EXAMPLE 1

(illustrated in FIG. 1)

Fitted to a rotary disc-type filter comprising: a tank 2 having a capacity of 30 m³ was a cylindrical drive shaft 3 which was 0.6 meter in diameter and on which were mounted as a parallel array: seven discs for separating the liquid and solid phases of an aqueous suspension of Al(OH)$_3$ having a concentration of dry matter of 0.25 tonne per cubic meter.

The drive shaft 3 was immersed in the suspension to a level corresponding to 50% of its diameter.

The diameter of each disc was 3.9 meters.

The apparatus according to the invention comprised a planar partition member 6 which was 67 cm in diameter and which was fixed with respect to the shaft 3. The partition member was provided on its periphery with a planar surface 7 forming a bearing surface and a concentric surface 8 joined to the bearing surface. The partition member comprised steel.

A retaining ring 9 which was of I-shaped cross-section and the two largest dimensions of which were 70 cm and 58 cm, being 1 cm in thickness, was mounted on the surface 7 and the concentric surface 8. The retaining ring 9 was made of neoprene.

A collar 10 with an internal diameter of 70 cm, being of U-shaped cross-section, was adjusted longitudinally and transversely in its position of use by means of the adjusting member 11 which is not described but which is of known type, in such a way that the leakage 12 of liquid phase is minimised. In this Example, the dimensions of the member 10 were identical to those of the ring, as the small size of the solid materials did not permit either of the two members to be dimensioned with tolerance.

The leakage at 12 was 30 liters per hour while the separation capacity of the filter was 2.5 m³/hour per square meter of filtering surface area.

EXAMPLE 2

(illustrated in FIG. 1)

Fitted to a rotary disc-type filter comprising: a tank 2 with a capacity of 5 m³ was a cylindrical drive shaft 3 which was 1.2 meters in diameter and on which were mounted as a parallel array, three discs for separating the liquid and solid phases of an aqueous suspension of Al(OH)$_3$, with a concentration of dry matter of 0.25 tonne per cubic meter.

A drive shaft 3 was immersed in the suspension to a level corresponding to 50% of its diameter.

The diameter of each disc was 5.2 meters.

The apparatus according to the invention comprised a planar partition member 6 with a diameter of 130 cm, being fixed with respect to the shaft 3. On its periphery, the planar partition member was provided with a planar surface 7 forming a bearing surface, and a concentric surface 8 joined to the bearing surface. The partition member was made of steel.

A retaining ring 9 of I-shaped cross-section, the two largest dimensions of which were 135 cm and 124 cm, being 2 cm in thickness, was mounted on the surface 7 and the concentric surface 8. The ring 9 was made of neoprene.

A collar 10 with an inside diameter of 135 cm, being of U-shaped cross-section, was adjusted longitudinally and transversely in its position of use by means of the adjusting member 11 which is not described and which is of known type, in such a way as to minimise the leakage at 12 of the liquid phase. In this example, the dimensions of the collar 10 were identical to those of the retaining ring, as the small size of the solid materials did not permit either of the two components to be dimensioned with tolerance.

The amount of leakage at 12 was 50 liters/hour, while the separation capacity of the filter was 2.5 m³/hour per square meter of filtering surface area.

I claim:

1. A retaining apparatus between a fixed wall (2) and a rotary member (3) passing therethrough, for retaining a liquid phase which is possibly charged with solid materials, in order to provide a seal which eliminates friction while accepting limited leakage of the liquid phase, characterised in that said apparatus comprises:
    (a) a partition member (6) which is fixed with respect to the rotary member (3) and the periphery of which has at least one planar surface (7) which is perpendicular to the axis of rotation of said member, forming a bearing surface, and a surface (8) which is concentric to said axis and which is joined to the bearing surface (7), (b) a retaining ring (9) which is positioned on the planar surface (7) and the concentric surface (8) of the partition member, said retaining ring (9) defining a single radially facing peripheral sealing surface, (c) a collar (10) which is joined to the wall, being of inside diameter that is greater than the outside diameter of the ring (9) and which is provided with a means for longitudinal positioning thereof on the wall (2) through which the rotary member (3) passes, and an adjusting and locking means (11) for preventing rotation thereof, said collar (10) defining a single radially facing peripheral sealing surface, the seal between the fixed wall (2) and the rotary member (3) being constituted solely by said peripheral sealing surfaces, and (d) the peripheral sealing surfaces facing each other and being substantially parallel to the axis of rotation, a slight gap existing between said sealing surfaces to provide frictionless sealing with limited leakage.

2. A liquid phase retaining apparatus according to claim 1 characterised in that the partition member (6) is selected from the group consisting of planar, frustoconical, hemispherical, convex and concave surfaces, wherein said surfaces are perpendicular to the axis of rotation of the rotary member.

3. A liquid phase retaining apparatus according to claim 1 characterised in that the retaining ring (9) is of a section selected from the group consisting of rectangular shape, L shape wherein the horizontal leg thereof is parallel to the axis of rotation, and U shape wherein the arms thereof are perpendicular to the axis of rotation.

4. A liquid phase retaining apparatus according to claim 1 characterised in that the retaining ring (9) is made of a material selected from the group consisting of metals, alloys which are machined or cast and moulded polymer materials.

5. A liquid phase retaining apparatus according to claim 1 characterised in that the section of the collar (10) is of a section selected from the group consisting of L shape, wherein the horizontal leg thereof is parallel to the axis of rotation and U shape, wherein the arms thereof are perpendicular to the axis of rotation.

6. A liquid phase retaining apparatus according to claim 1, further comprising recovery means mounted adjacent to the fixed wall for returning to the liquid phase the liquid which leaks through the seal.

* * * * *